US012282487B2

(12) United States Patent
Morrison et al.

(10) Patent No.: US 12,282,487 B2
(45) Date of Patent: *Apr. 22, 2025

(54) METHODS, APPARATUSES AND COMPUTER PROGRAM PRODUCTS FOR OUTPUTTING IMPROVED AUTOSUGGESTIONS IN A GROUP-BASED COMMUNICATION PLATFORM

(71) Applicant: Salesforce, Inc., San Francisco, CA (US)

(72) Inventors: Andrew S. Morrison, Brooklyn, NY (US); Aaron J. Maurer, Washington, DC (US)

(73) Assignee: Salesforce, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/543,205

(22) Filed: Dec. 18, 2023

(65) Prior Publication Data
US 2024/0119060 A1 Apr. 11, 2024

Related U.S. Application Data

(63) Continuation of application No. 17/825,185, filed on May 26, 2022, now Pat. No. 11,886,449, which is a continuation of application No. 17/328,543, filed on May 24, 2021, now Pat. No. 11,379,491, which is a
(Continued)

(51) Int. Cl.
G06F 16/00 (2019.01)
G06F 16/2457 (2019.01)
G06F 16/25 (2019.01)

(52) U.S. Cl.
CPC ...... *G06F 16/24578* (2019.01); *G06F 16/252* (2019.01)

(58) Field of Classification Search
CPC .................. G06F 16/24578; G06F 16/252
See application file for complete search history.

(56) References Cited

U.S. PATENT DOCUMENTS 9,378,488 B1 * 6/2016 Saraya ............... H04L 65/611
2010/0228710 A1 * 9/2010 Imig ................. G06F 16/9535
707/706
(Continued)

*Primary Examiner* — Dinku W Gebresenbet
(74) *Attorney, Agent, or Firm* — Holland & Hart LLP

(57) ABSTRACT

An apparatus is provided for outputting suggested query items by a group-based communication platform. The apparatus may include at least one memory and at least one processor configured to detect group-based communication platform query data stored in a memory of the apparatus. The processor is also configured to rank suggested query items based on the group-based communication platform query data. The processor is further configured to detect non-keystroke engagement of a search input interface of the group-based communication platform. The processor is further configured to determine a first subset of the suggested query items based on the ranking of the suggested query items and automatically launch a query suggestion interface including a first subset of the suggested query items in response to detecting the non-keystroke engagement of the search input interface. Corresponding methods and computer program products are also provided.

20 Claims, 9 Drawing Sheets

Related U.S. Application Data continuation of application No. 15/958,484, filed on Apr. 20, 2018, now Pat. No. 11,016,982.

(56) References Cited

U.S. PATENT DOCUMENTS

| | | | | |
|---|---|---|---|---|
| 2012/0158715 A1* | 6/2012 | Maghoul | ............. | G06F 16/9538 |
| | | | | 707/E17.014 |
| 2015/0350117 A1* | 12/2015 | Bastide | ................ | G06F 16/245 |
| | | | | 715/752 |
| 2019/0155962 A1* | 5/2019 | Vade | ................... | G06F 16/9535 |

\* cited by examiner

METHODS, APPARATUSES AND COMPUTER PROGRAM PRODUCTS FOR OUTPUTTING IMPROVED AUTOSUGGESTIONS IN A GROUP-BASED COMMUNICATION PLATFORM

RELATED APPLICATIONS

The present Application for Patent is a continuation of U.S. patent application Ser. No. 17/825,185, filed on May 26, 2022, which is a continuation of U.S. patent application Ser. No. 17/328,543, filed on May 24, 2021, now U.S. Pat. No. 11,379,491, which is a continuation of U.S. patent application Ser. No. 15/958,484, filed on Apr. 20, 2018, now U.S. Pat. No. 11,016,982, all of which are assigned to the assignee hereof and expressly incorporated by reference herein.

BACKGROUND

Various methods, apparatuses, and systems are configured to output suggested query and navigational items to a search suggestion interface of a group-based communication platform. Applicant has identified many deficiencies and problems associated with existing methods, apparatuses, and systems. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like for outputting suggested query and navigational items to a search suggestion interface of a group-based communication platform.

In one example embodiment, an apparatus for outputting suggested query items by a group-based communication platform is provided. The apparatus may include a processor and a memory including computer program code. The memory and computer program code are configured to, with the processor, cause the apparatus to at least perform operations including detecting group-based communication platform query data stored in the memory of the apparatus. The at least one memory and the computer program code are further configured to, with the processor, cause the apparatus to rank suggested query items based on the group-based communication platform query data. The at least one memory and the computer program code are further configured to, with the processor, cause the apparatus to detect non-keystroke engagement of a search input interface of the group-based communication platform. The at least one memory and the computer program code are further configured to, with the processor, cause the apparatus to in response to detecting the non-keystroke engagement of the search input interface determine a first subset of the suggested query items based on the ranking of the suggested query items and automatically launch a query suggestion interface including the first subset of the suggested query items.

In another example embodiment, a method for outputting suggested query items by a group-based communication platform is provided. The method may include detecting group-based communication platform query data stored in a memory of an apparatus. The method may further include ranking suggested query items based on the group-based communication platform query data. The method may further include detecting non-keystroke engagement of a search input interface of the group-based communication platform. The method may further include in response to detecting the non-keystroke engagement of the search input interface, determining a first subset of the suggested query items based on the ranking of the suggested query items and automatically launching a query suggestion interface including the first subset of the suggested query items.

In another example embodiment, a computer program product for outputting suggested query items by a group-based communication platform is provided. The computer program product includes at least one computer-readable storage medium having computer-readable program code portions stored therein. The computer-executable program code instructions may include program code instructions configured to detect group-based communication platform query data stored in a memory of an apparatus. The program code instructions may also rank suggested query items based on the group-based communication platform query data. The program code instructions may also detect non-keystroke engagement of a search input interface of the group-based communication platform. The program code instructions may also determine a first subset of the suggested query items based on the ranking of the suggested query items and may automatically launch a query suggestion interface including the first subset of the suggested query items in response to detecting the non-keystroke engagement of the search input interface.

In yet another example embodiment, a system for outputting suggested query items by a group-based communication platform is provided. The system includes a client device including at least one processor and at least one memory. The system also includes a group-based communication server including at least one processor and at least one memory. The processor of the group-based communication server is configured to generate group-based communication platform query data based in part on analyzing content items of the group-based communication platform. The processor of the group-based communication server is further configured to send the group-based communication platform query data to the client device. The processor of the client device is configured to receive the group-based communication platform query data from the group-based communication server and store the group-based communication platform query data to the memory of the client device. The processor of the client device is further configured to rank suggested query items based on the group-based communication platform query data. The processor of the client device is further configured to detect non-keystroke engagement of a search input interface of the group-based communication platform. The processor of the client device is further configured to in response to detecting the non-keystroke engagement of the search input interface, determine a first subset of the suggested query items based on the ranking of the suggested query items and automatically launch a query suggestion interface including the first subset of the suggested query items.

BRIEF DESCRIPTION OF THE SEVERAL VIEW OF THE DRAWINGS

Having thus described some embodiments in general terms, references will now be made to the accompanying drawings, which are not drawn to scale, and wherein:

DETAILED DESCRIPTION OF VARIOUS EMBODIMENTS

Figure 1:
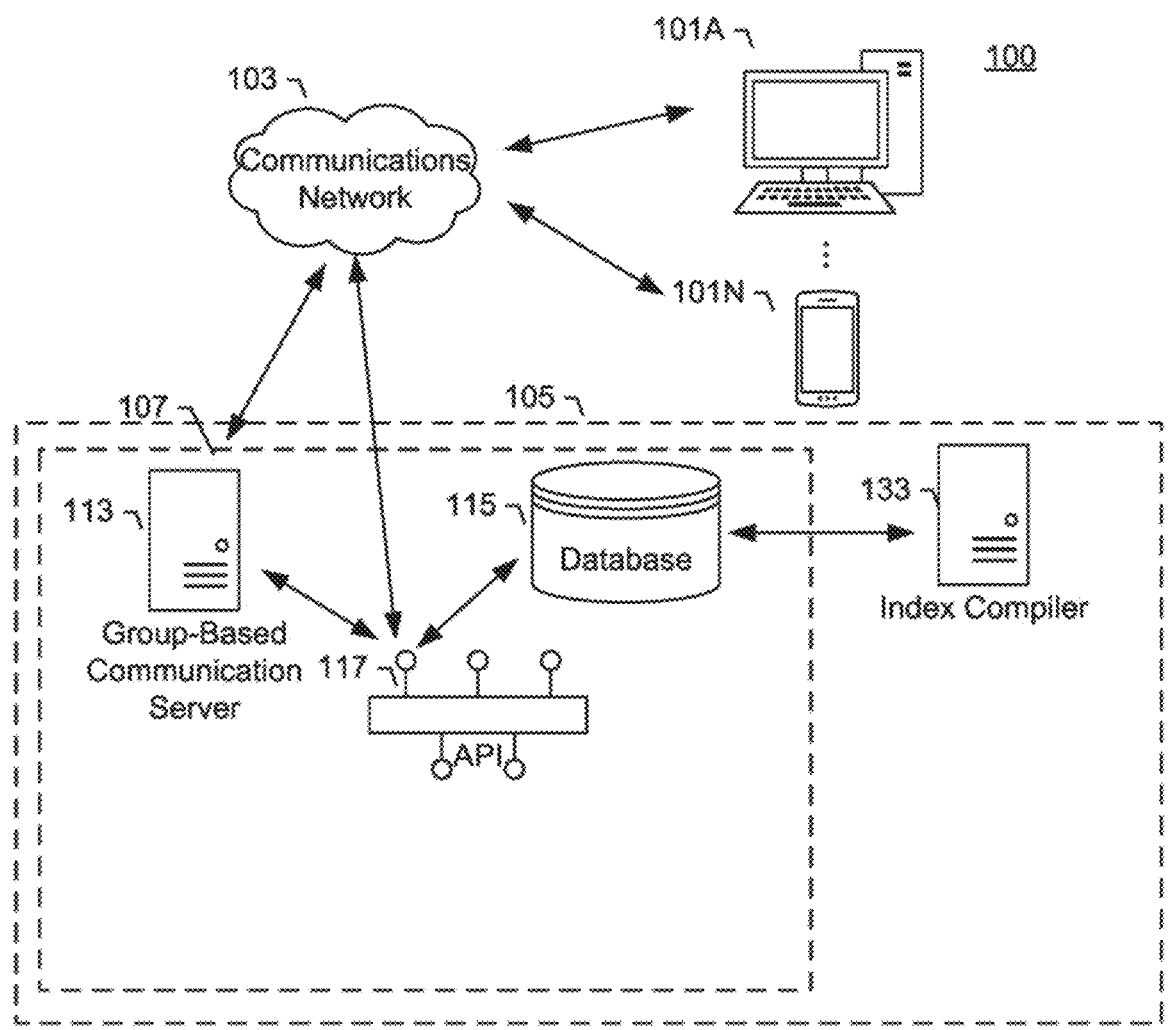
FIG. 1 is an example system infrastructure diagram of a group-based communication platform in accordance with some exemplary embodiments of the present invention.

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention relate generally to outputting suggested query and navigational items to a search suggestion interface of a group-based communication platform. More specifically, various embodiments of the present invention relate to automatically outputting suggested query and navigational items to a search suggestion interface of the group-based communication platform in response to search queries, and provides improvements in a search query management system based in part on performing search queries locally on client devices to free up network devices from performing the search queries and determining suggested results, which conserves processing capacity, and memory capacity of network devices and conserves network bandwidth by minimizing data traffic on the network since the search queries are performed locally on client devices.

Applicant has identified that limiting search query latency is important to improving any implementation of a group-based communication platform. Solutions that place substantial query activity at the network, as opposed to the client device, were deemed to create undue query latency. For instance, a search query is generally entered via a user input on a client device which sends the search query to a network that determines suggested search recommendations to send to the client device to satisfy the search query. There are technical drawbacks and problems to these approaches. For example, the round trip time needed to send a search query from a client device to the network and for the network to then compute and send the suggested recommendations to each client device that initiated a search query request may be time consuming creating high network latency and may increase data traffic on the network causing network bandwidth congestion since the network typically facilitates search queries from multiple client devices. The high network latency and bandwidth congestion may constrain computing resources (e.g., processing capacity, memory capacity, etc.) of the network. These approaches requiring the network to return suggested recommendations in response to search queries may not provide the search results that a user desires resulting in an undesirable user experience. Additionally, users may not desire in all instances to enter search queries in a user input to identify relevant search results by trial and error (e.g., if the search results are irrelevant, the user typically enters a new search query in the user input to receive new search results). This approach may be time consuming and cumbersome to some users.

Systems structured in accordance with various exemplary embodiments of the invention overcome these challenges. For example, some exemplary embodiments automatically provide recommended suggestions to client devices faster than some systems by enabling the client devices to determine the suggestions to queries. By producing query and navigational suggestions based on search queries locally on a client device as opposed to over the network, response times of less than 100 ms are achieved by exemplary embodiments representing a significant improvement over latencies typically on the order of 1000 ms when performing a search over the network.

In this regard, for example, a client device(s) of the exemplary embodiments may examine data determined to be relevant to one or more users of a group-based communication platform and may automatically output suggestions to a query suggestion interface of the client device(s) even in instances in which the search input has not yet received any search criteria (e.g., one or more keystrokes of a search query), as described more fully below. By enabling a client device(s) to determine the suggestions to output to a query suggestion interface, the latency of the network may be reduced and the bandwidth of the network may be conserved thereby conserving computing resources of the network.

Furthermore, by examining data that may be of interest/relevant to users of the group-based communication platform to automatically provide the suggestions, the exemplary embodiments may formulate better suggestions and in some instances may enable the client device to directly navigate users to one or more provided suggestions (e.g., a direct message (DM) communication with another user, etc.) resulting in a better user experience.

As such, systems structured in accordance with various embodiments of the invention provide specific, technical solutions to technical problems faced by some systems.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party developer support that grants appropriate access to the data and allows third parties to build applications and bots to integrate with customer's workflows.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "group-based communication channel data" refers to data items associated with communications between, and files shared by, channel members of a group-based communication channel.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., j doe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise American Standard Code for Information Interchange (ASCII) text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

The term "message communication data" refers to messages exchanged (direct messages (DMs) (e.g., messages sent by users directly to each other instead of through channels), reply messages, forwarded messages, etc.) between an apparatus (e.g., a client device) associated with a user account of a user and one or more other users of the group-based communication platform.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

Figure 6:
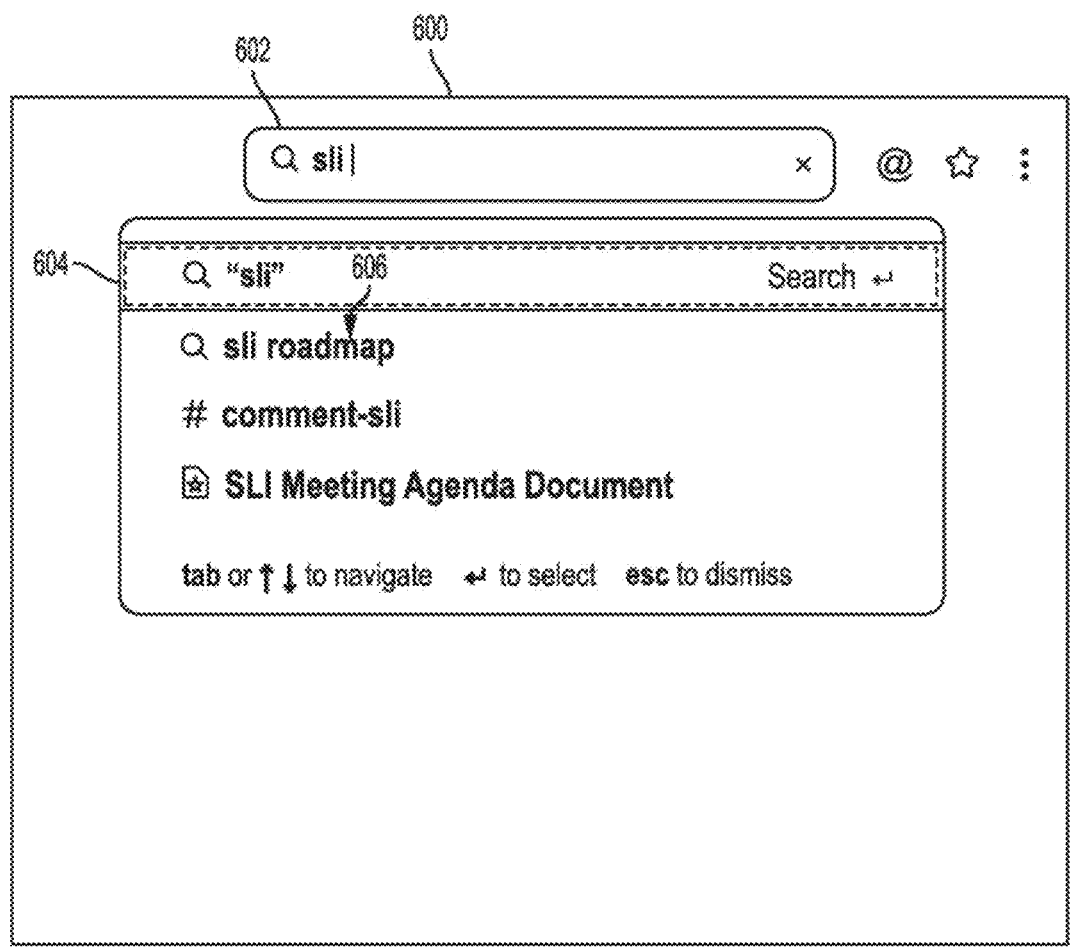

The term "search input interface" refers to a search box, search menu, search field, or the like of a graphical user interface configured to detect user input (e.g., one or more characters) entered into the search input interface to perform a query search on the user input. For example, the search input interface 402 of FIG. 4 and the search input interface 602 of FIG. 6 are examples of search input interfaces.

The term "query suggestion interface" refers to a section of a graphical user interface that includes a list (e.g., a drop down list) of one or more selectable suggested query items that a user may navigate between, via the graphical user interface, and may select at least one of the suggested query items. For example, the query suggestion interface 404 of FIG. 4 and the query suggestion interface 604 of FIG. 6 are examples of query suggestion interfaces.

The term "group-based communication platform query data" refers to data items of the group-based communication platform including at least one of (i) query history data correlated to a user account associated with an apparatus (e.g., a client device) of a user, (ii) user engagement data representing interactions with items (e.g., files, messages, conversations, etc.) of the group-based communication platform that are correlated to the user account associated with the apparatus, (iii) common user engagement data representing interactions with items of the group-based communication platform that are correlated to a subset of group-based communication platform users (e.g., channel members) that are determined to share profile attributes with the user account associated with the apparatus, or (iv) general user engagement data representing interactions with items of the group-based communication platform that are correlated to all users of the group-based communication platform.

The term "suggested query items" refers to a result set of the group-based communication platform query data that includes candidate search recommendations and/or navigational items (e.g., user identifiers, group-based communication channels, files, etc.) to suggest to an apparatus (e.g., a client device) of a user.

The term "non-keystroke engagement" refers to user interaction, via a graphical user interface, with a search input interface in which such user interaction is free from (i.e., excludes) the entering of one or more (e.g., keystroke) characters into the search input interface. For example, touch-screen or mouse click engagement with a search input interface is one example of non-keystroke engagement.

The term "keystroke engagement" refers to entering of one or more keystrokes into a search input interface of a graphical user interface. For example, input of one or more characters (e.g., alphanumeric characters) into a search input interface (e.g., search input interface 602 of FIG. 6) is one example of keystroke engagement.

Figure 4:
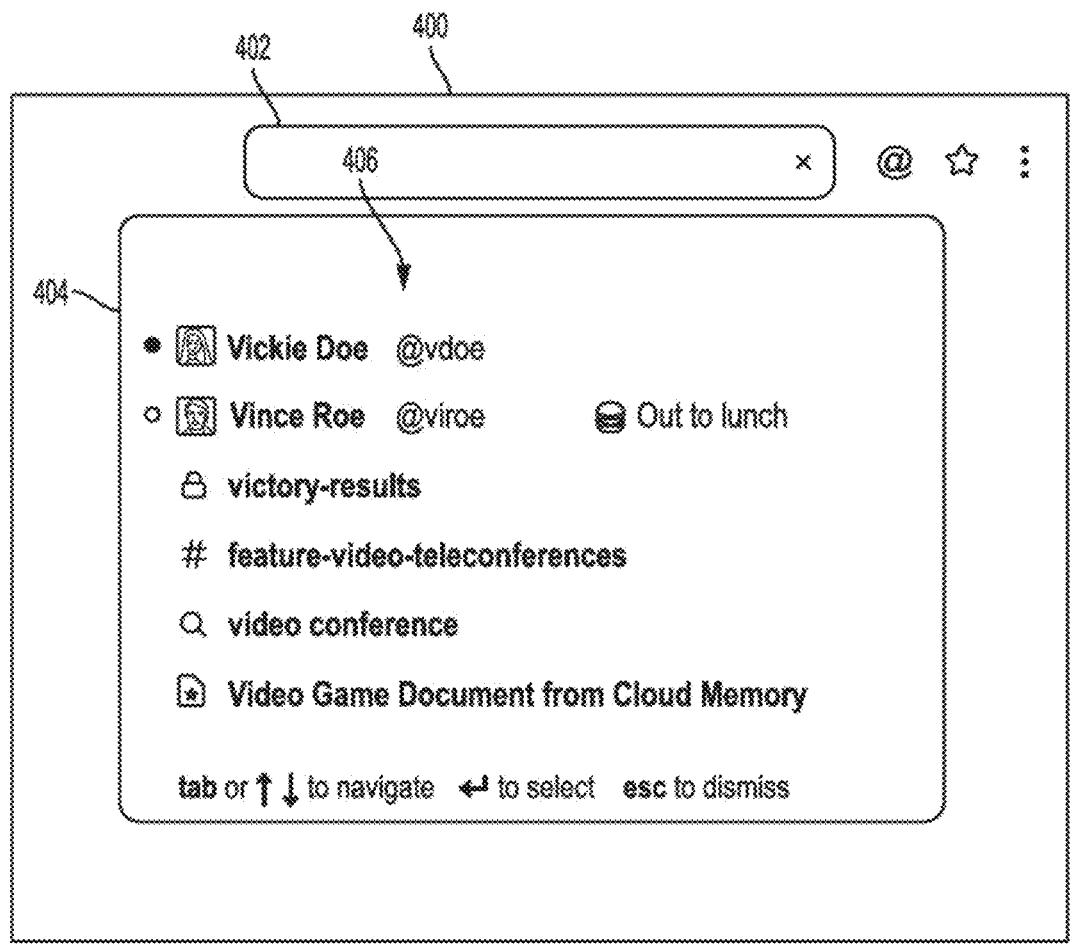
FIGS. 4-7 are diagrams of example user interfaces in accordance with some embodiments of the present invention.

The term "first subset of the suggested query items" refers to less than an entire portion of the suggested query items that are based on a ranking of the suggested query items which may be provided to the query suggestion interface in response to detection of a non-keystroke engagement with the search input interface. For example, the suggested query items 406 of FIG. 4 are one example of a first subset of the suggested query items.

The term "selected query" refers to a selection by a user, via a graphical user interface, of at least one suggested query item from the query suggestion interface. For example, touch-screen engagement or mouse click engagement via a user interface (e.g., user interface 600 of FIG. 6) to select a suggested query item (e.g. selectable suggestion 608 of FIG. 6) from a query suggestion interface (e.g., query suggestion interface 604 of FIG. 6) is one example of a selected query.

The term "query selection indication" refers to a detection by an apparatus (e.g., a client device) of a selection of at least one suggested query item from the query suggestion interface. For example, a processing device (e.g., processor 302 of FIG. 3) of an apparatus (e.g., a client device) detecting touch-screen engagement or mouse click engagement to a select a suggested query item from a query suggestion interface (e.g., query suggestion interface 604 of FIG. 6) is one example of a query selection indication.

Figure 3:
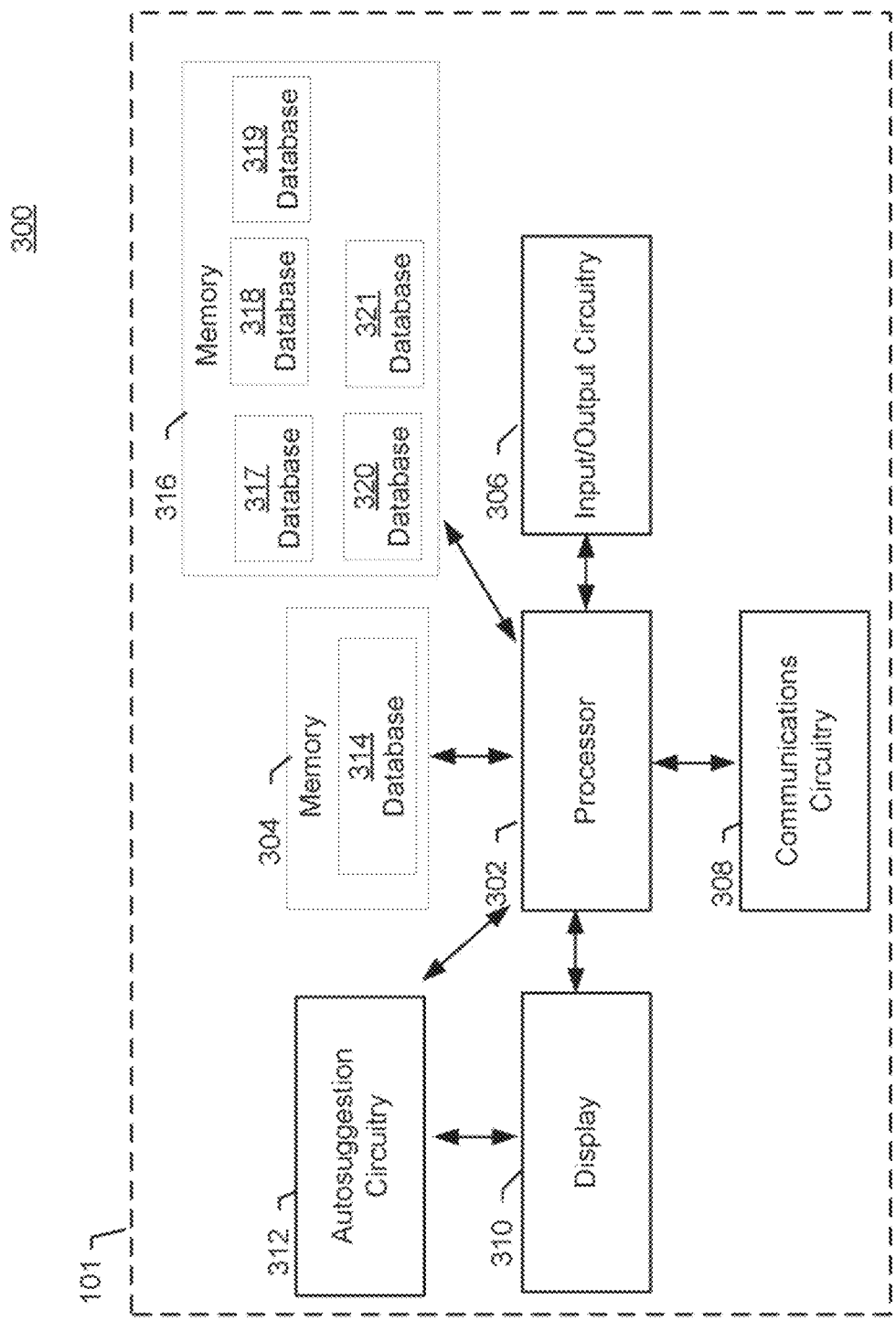
FIG. 3 is a diagram of an apparatus of a client device in accordance with some exemplary embodiments of the present invention.

The term "permitted database(s)" refers to a database(s) that one or more users of the group-based communication platform are permitted to access based on credentials of user accounts of the users. For example, the permitted database 314 of FIG. 3 is one example of a permitted database.

The term "credentials associated with the user account" refers to profile attributes of the user account of a user that define communication and data access rights of the user in the group-based communication platform. The credentials may also include login information for the user including the user's username and password.

The term "second subset of the suggested query items" refers to suggested query items that are determined based on detected keystroke engagement of the search input interface. For example, the suggested query items 606 of FIG. 6 are one example of a second subset of the suggested query items.

The term "user selection engagement" refers to a detection by an apparatus (e.g., a client device) of a selection input, or other interaction with the query suggestion interface. For example, touch-screen or mouse click engagement with a query suggestion interface to select a suggested query item is one example of user selection engagement.

The term "directly and without an intervening database query step" refers to launching an interface for a user to communicate directly with one or more other users or access at least one file without performing another step to query a permitted database for data of the group-based communication platform.

The term "query history data" refers to one or more prior search query results associated with past search queries correlated to a user account(s) associated with an apparatus of a user(s) of the group-based communication platform.

The term "user engagement data representing interactions with items of the group-based communication platform" refers to detecting interactions by one or more apparatuses of one or more users of the group-based communication platform with respective data items (e.g., messages, files, conversations, etc.) of the group-based communication platform.

The term "common user engagement data" refers to data representing interactions with items of the group-based communication platform that are correlated to a subset of group-based communication platform users that are determined to share profile attributes with a user account of another user of the group-based communication platform. For example, in one embodiment, a common subset of users may be determined based on membership in a group-based communication channel. In other embodiments, common user groups may be determined based on organizational role (e.g., accountant, human resources, etc.), topic interest (e.g., open source issues, craft beer, sports, etc.), or other shared profile attribute.

The term "general user engagement data" refers to data representing interactions with items of the group-based communication platform that are correlated to all users of public groups having unrestricted access to non-private data within the group-based communication platform.

The term "update query data file" refers to an update of group-based communication platform query data that includes at least one updated item of: (i) query history data correlated to a user account associated with an apparatus, (ii) user engagement data representing interactions with items of the group-based communication platform correlated to the user account associated with the apparatus, or (iii) common user engagement data representing interactions with items of the group-based communication platform correlated to a subset of group-based communication platform users that are determined to share profile attributes with the user account associated with the apparatus.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present invention may operate. Users may access a group-based communication system 105 via a communications network 103 using client devices 101A-101N.

The client devices 101A-101N may be any computing device as defined above. Electronic data received by group-based communication system 105 from the client devices 101A-101N may be provided in various forms and via various methods. For example, the client devices 101A-101N may include desktop computers, laptop computers, smartphones, netbooks, tablet computers, wearables, and the like.

In embodiments where a client device of client devices 101A-101N is a mobile device, such as a smart phone or tablet, the client device of client devices 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications.

Additionally or alternatively, the client device of client devices 101A-101N may interact with the group-based communication system 105 via a web browser. As yet another example, the client device of client devices 101A-101N may include various hardware or firmware designed to interface with the group-based communication system 105.

Communications network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 103 may include a cellular telephone, an 802.11, 802.16, 802.20, and/or WiMax network. Further, the communications network 103 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JavaScript Object Notation (JSON) objects sent via a Websocket channel. In some embodiments, the protocol is JSON over RPC, JSON over REST/HTTP, and the like.

In some embodiments, the online data management system 107 comprises a group-based communication server 113, one or more databases 115, and an Application Programming Interface (API) component 117.

The group-based communication server 113 may be embodied as a computer or computers. The group-based communication server 113 may provide for receiving of electronic data from various sources, including but not limited to the client devices 101A-101N. For example, the group-based communication server 113 may be operable to receive and post or transmit group-based messaging communications provided by the client devices 101A-101N via communications network 103.

The API component 117 may be embodied in one or more computers or computing apparatus, such as a server or servers. The API component 117 may be a set of routines, protocols and software system tools that facilitate the data transmission among and between various components of the group-based communication system 105. For example, the API component 117 may receive queries from client devices 101A-101N via the communications network 103. It may also receive data from and transmit data to the group-based communication server 113. The API component 117 may also transmit data to the one or more databases 115.

Further, the API component 117 provides routines that allow a client to search for messages or message metadata. For example, the search.messages API component has a "query" field and performs a search given that query. It also allows for search of message metadata (for example, has: reaction or has:star, from:john).

The one or more databases 115 may be embodied as a data storage device(s) such as a Network Attached Storage (NAS) device or devices, or as a separate database server or servers. In some embodiments, the one or more databases 115 are relational database(s), such as MySQL database(s). The one or more databases 115 include information accessed and stored by the group-based communication server 113 and transmitted from API component 117, and facilitate the operations of the group-based communication server 113. For example, the one or more databases 115 may include, without limitation, a plurality of messaging communications organized among a plurality of group-based communication channels, and/or the like.

In this regard, the one or more databases 115 may serve as the primary data storage of the group-based communication system 105. As described hereinafter, the one or more databases 115 store backups (snapshots) of the data storage, and makes these backups available for index generation processes.

The index compiler 133 may process the metadata and/or contents of the message to index the message (e.g., using the conversation primitive as described below) and facilitate various facets of searching (i.e., search queries that return results from the group-based communication system 105). In one example embodiment, the message may be indexed such that a company's or a group's messages are indexed separately (e.g., in a separate index associated with the group and/or company that is not shared with other groups and/or companies). In another example embodiment, messages may be indexed at a separate distributed repository (e.g., to facilitate data isolation for security purposes).

An example of electronic information exchange among one or more client devices 101A-101N and the group-based communication system 105 is described below.

In some embodiments of an example group-based communication system 105, a message or messaging communication may be sent from a client device of client devices 101A-101N to a group-based communication system 105. In various implementations, the message may be sent to the group-based communication system 105 over communications network 103 directly by a client device of client devices 101A-101N. The message may be sent to the group-based communication system 105 via one or more intermediaries, such as group-based communication server 113, and/or the like. For example, client devices 101A-101N may be a desktop, a laptop, a tablet, a smartphone, and/or the like that is executing a client application (e.g., a group-based communication app).

In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including Extensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL
<digital_cert_link>www.mydigitalcertificate.com/
JohnDoeDaDoeDoe@gmail.com/mycertifcate.dc</digital_cert_link>
            //OPTIONAL
<digital_certificate>_DATA_</digital_certificate>
        </user_account_credentials>
    </user_accounts_details>
    <client_details> //iOS Client with App and Webkit
        //it should be noted that although several client details
        //sections are provided to show example variants of
client
        //sources, further messages will include only on to
save
        //space
        <client_IP>10.0.0.123</client_IP>
        <user_agent_string>Mozilla/5.0 (iPhone; CPU iPhone OS
7_1_1 like Mac OS X) AppleWebKit/537.51.2 (KHTML, like Gecko)
Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
```

```
        </client_details>
        <client_details> //iOS Client with Webbrowser
            <client_IP>10.0.0.123</client_IP>
            <user_agent_string>Mozilla/5.0 (iPhone; CPU iPhone OS
7_1_1 like Mac OS X) AppleWebKit/537.51.2 (KHTML, like Gecko)
Version/7.0 Mobile/11D201 Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_
UDID>
            <client_OS>iOS</client_OS>
            <client_OS_veision>7.1.1</client_OS_version>
            <client_app_type>web browser</client_app_type>
            <client_name>Mobile Safari</client_name>
            <client_version>9537.53</client_version>
        </client_details>
        <client_details> //Android Client with Webbrowser
            <client_IP>10.0.0.123</client_IP>
            <user_agent_string>Mozilla/5.0 (Linux; U; Android 4.0.4; en-
us; Nexus S Build/IMM76D) AppleWebKit/534.30 (KHTML, like Gecko)
Version/4.0 Mobile Safari/534.30</user_agent_string>
            <client_product_type>Nexus S</client_product_type>
            <client_serial_number>YXXXXXXXXZ</client_serial_number>
            <client_UDID>FXXXXXXXXX-XXXX-XXXX-XXXX-
XXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
        </client_details>
        <client_details> //Mac Desktop with Webbrowser
            <client_IP>10.0.0.123</client_IP>
            <user_agent_string>Mozilla/5.0 (Macintosh; Intel Mac OS X
10_9_3) AppleWebKit/537.75.14 (KHTML, like Gecko) Version/7.0.3
Safari/537.75.14</user_agent_string>
            <client_product_type>MacPro5,1</client_product_type>
            <client_serial_number>YXXXXXXXXZ</client_serial_number>
            <client_UDID>FXXXXXXXXX-XXXX-XXXX-XXXX-
XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
        </client_details>
        <message>
            <message_identifier>ID_message_10</message_identifier>
            <team_identifier>ID_team_1</team_identifier>
            <channel_identifier>ID_channel_1</channel_identifier>
            <contents>That is an interesting invention. I have attached a
copy our patent policy.</contents>
            <attachments>patent_policy.pdf</attachments>
        </message>
</auth_request>
```

The group-based communication system 105 comprises at least one group-based communication server 113 that may create a storage message based upon the received message to facilitate message storage in one or more databases 115. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 113 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting invention. I have attached a copy our
patent policy.</contents>
    <attachments>patent_policy.pdf</attachments>
    <conversation_primitive>
        conversation includes messages: ID_message_8,
ID_message_9, ID_message_10,
        ID_message_11, ID_message_12
    </conversation_primitive>
</storage_message>
```

In some embodiments, a group identifier as defined above may be associated with the message. In embodiments, a group-based communication channel identifier as defined above may be associated with the message. In some embodiments, a sending user identifier as defined above may be associated with the message. In one implementation, the message may be parsed (e.g., using Pre Hypertext Processor (PHP) commands) to determine a sending user identifier of the user who sent the message.

In some embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:
SELECT messageResponses
FROM MSM_Message
WHERE messageID=ID_message_10.
As described further hereinafter, the above MySQL database command may be modified and used to generate documents for live or computed indexing (via MySQL queries for live indexing in the API component 117.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In some embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In some embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In some embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitives may be determined based on analysis of topics discussed in the message and other messages (e.g., in the channel) and/or proximity (e.g., message send order proximity, message send time proximity) of these messages. The conversation primitives are also used for shingling and searching over conversations (the messages and their surrounding messages).

In some embodiments, various metadata (determined as described above) and the contents of the message are transmitted from the client devices 101A-101N to the group-based communication system 105 via the communications network 103.

Upon receiving electronic message data from the client devices 101A-101N via communications network 103, the group-based communication server 113 processes and prioritizes electronic message data. The group-based communication server 113 provides persistent broadcast of electronic messages to the client devices 101A-101N connected to the group-based communication system 105 via the communications network 103. For example, when a user John sends an electronic message in a group-based communication channel using a client device, the group-based communication server 113 broadcasts this electronic message to other client devices associated with the same group-based communication channel. In this regard, the group-based communication server 113 serves as a message amplifier.

The group-based communication server 113 also communicates with the API component 117 to initiate the process of writing electronic message data into the one or more databases 115.

In an example embodiment, the group-based communication server 113 may examine one or more storage messages that the group-based communication server 113 generated from received messages of one or more of the client devices 101A-101N (in the manner described above) of the group-based communication system 105 to generate group-based communication platform query data, which may be provided to a client device (e.g., a client device 101A-101N) for performing local (i.e., on the client device 101A-101N) search queries. For example, the group-based communication server 113 may examine the prior search queries (i.e., the query histories (e.g., query histories correlated to user accounts)) received from one or more of the client devices 101A-101N and may analyze the storage messages (e.g., topics associated with the messages, message contents, message hierarchy data, attachments to messages, conversations (e.g., conversation primitives), etc.) to detect files that one or more users of the group-based communication system 105 interacted with or engaged with to determine items for inclusion in the group-based communication platform query data.

The group-based communication server 113 may store the group-based communication platform query data in the one or more databases 115. Furthermore, the group-based communication server 113 may also prioritize and rank items of the group-based communication platform query data, as described more fully below.

The group-based communication server 113 may send the group-based communication platform query data to a respective client device (e.g., a client device 101A-101N) in response to a request received by the API component 117. For example, the API component 117 may receive an automatically generated request (e.g., an API call) for the group-based communication platform query data from the respective client device (e.g., a client device 101A-101N) in response to detecting non-keystroke engagement of a search input interface (e.g., selection of the search input interface, launching of the search input interface, etc.) of the respective client device and in this regard, the group-based communication server 113 may communicate with the API component 117 to retrieve the group-based communication platform query data from the one or more databases 115 to provide the group-based communication platform query data to the respective client device (e.g., a client device 101A-101N).

In some example embodiments, the group-based communication server 113 may provide the group-based communication platform query data to a client device (e.g., a client device 101A-101N) periodically. For instance, the group-based communication server 113 may provide the group-based communication platform query data to a client device once a day (e.g., or some other temporal period (e.g., every two days, etc.)).

Alternatively, the group-based communication server 113 may provide the group-based communication platform query data to the client device upon a restart of the client device. For example, upon restart of the client device, the client device may send the request for the group-based communication platform query data to the API component 117 and in response, the group-based communication server 113 may retrieve the group-based communication platform query data from the one or more databases 115 and may send the group-based communication platform query data to the client device.

In some other example embodiments, the group-based communication server 113 may provide the group-based communication platform query data to a client device (e.g., a client device 101A-101N) of a new user joining the group-based communication system 105 in response to the client device executing an "app" (e.g., for the first time) to interact with the group-based communication system 105 or in response to authenticating login credentials (e.g., entered via a webpage corresponding to the group-based communication system 105) associated with a user account of the new user.

Example Apparatuses Utilized With Various Embodiments

Figure 2:
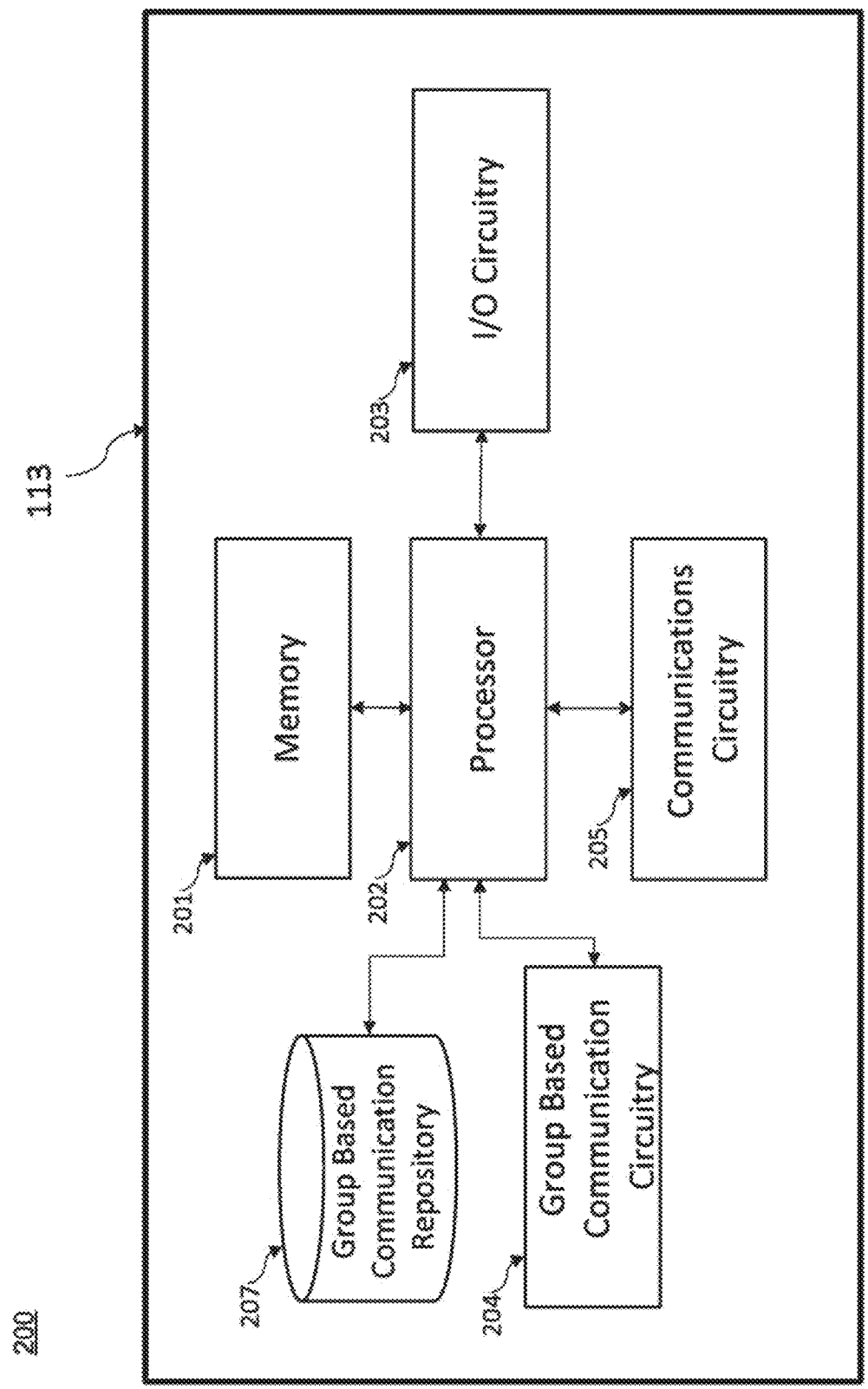
FIG. 2 is a diagram of an apparatus of a group-based communication server in accordance with some exemplary embodiments of the present invention.

The group-based communication server 113 may be embodied by one or more computing systems, such as apparatus 200 shown in FIG. 2. The apparatus 200 may include a processor 202, a memory 201, input/output circuitry 203, communications circuitry 205, group-based communication repository 207 and group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions (e.g., computer program instructions (also referred to herein as program code instructions)), or the like, for enabling the apparatus 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may generate group-based communication platform query data, which may be provided to one or more client devices to perform search queries, as described more fully below. Additionally, the group-based communication circuitry 204 may send and/or receive data from group-based communication repository 207. In some implementations, the sent and/or received data may be of enterprise-based digital content objects organized among a plurality of group-based communication channels. It should also be appreciated that, in some embodiments, the group-based communication circuitry 204 may include a separate processor, specially configured field programmable gate array (FPGA), or application specific integrated circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Referring now to FIG. 3, a client device(s) 101 (e.g., client devices 101A-101N) may be embodied by one or more computing systems, such as apparatus 300 shown in FIG. 3. The apparatus 300 may include processor 302, memory 304, which includes a database 314 (e.g., also referred to herein as permitted database 314), input/output circuitry 306, communications circuitry 308, display 310, autosuggestion circuitry 312 and memory 316, which includes databases 317, 318, 319, 320 and 321. Although these components 302-321 are described with respect to functional limitations, it should be understood that the particular implementations necessarily include the use of particular hardware. It should also be understood that certain of these components 302-321 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention. The memory 304 may include a database 314 which may store group-based communication platform query data to be analyzed by the autosuggestion circuitry 312 to determine suggested query items (e.g., candidate search recommendations and/or navigational items) in response to a search query.

The processor 302 (and/or co-processor or any other processing circuitry assisting or otherwise associated with the processor) may be in communication with the memory 316 via a bus for passing information among components of the apparatus. The memory 316 is non-transitory and may include, for example, one or more volatile and/or non-volatile memories. As such, for example, the memory 316 may be an electronic storage device (e.g., a computer-readable storage medium). The memory 316 may include one or more databases 317, 318, 319, 320 and 321 (e.g., also referred to herein as permitted databases 317, 318, 319, 320 and 321).

In some example embodiments, the group-based communication platform query data may also be stored in databases 317, 318, 319, 320 and 321. In an example embodiment, database 317 may be a permitted database for storage of files interacted with by the client device 101 correlated to a user account of a user. The database 317 may be associated with a user identifier associated with the user account of the user of the client device 101 permitting the client device 101 correlated to the user account to access the database 317.

The database 318 may be a permitted database storing one or more top files detected for the user and group-based communication channels/groups in which the user is a member. The top files may be retrieved periodically (e.g., nightly, etc.) from the group-based communication server 113. In this regard, the database 318 may be correlated with a group identifier associated with the group identifier for the corresponding group-based communication channel(s)/group(s) allowing the client devices (e.g., client devices 101A-101N) of users of the group-based communication channel(s)/group(s) to access the database 318.

The database 319 may be a permitted database storing one or more top query suggestions detected for the user and group-based communication channels/groups in which the user is a member. The top query suggestions may be retrieved periodically (e.g., nightly, etc.) from the group-based communication server 113. The database 319 may be correlated with a group identifier associated with the group identifier for the corresponding group-based communication channel(s)/group(s) allowing the client devices (e.g., client devices 101A-101N) of users of the group-based communication channel(s)/group(s) to access the database 319.

The database 320 may be a permitted database storing one or more message communications detected for the client devices correlated to user accounts of user of the group-based communication system 105. The database 320 may be linked to a remote database such as the one or more databases 315 of the group-based communication system 105. The database 320 may be correlated with a user identifiers associated with the user identifiers of the user accounts correlated with the client devices (e.g., client devices 101A-101N).

The database 321 may be a permitted database storing one or more message communications detected for a group of users of a group-based communication channel(s). The database 321 may be linked to a remote database such as one or more databases 315 of the group-based communication platform 105. The database 321 may be correlated with a group identifier associated with the group identifier for the group-based communication channel(s) permitting client devices (e.g., client devices 101A-101N) of the users of the group-based communication channel(s) to access the database 321.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a client device, a kiosk, or the like. In some embodiments, the input/output circuitry 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

The autosuggestion circuitry 312 includes hardware configured to analyze group-based communication platform query data to determine suggested query items in response to detection of a search query, as described more fully below. The autosuggestion circuitry 312 may utilize processing circuitry, such as the processor 302, to perform these actions. However, it should also be appreciated that, in some embodiments, the autosuggestion circuitry 312 may include a separate processor, specially configured Field Programmable Gate Array (FPGA), or Application Specific Integrated Circuit (ASIC) for performing the functions described herein. The autosuggestion circuitry 312 may be implemented using hardware components of the apparatus configured by either hardware or software for implementing these planned functions.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 208 may provide network interface functionality, and the like. Similarly, other elements of the apparatus 300 may provide or supplement the functionality of particular circuitry. For example, the processor 302 may provide processing functionality, the memory 304 may provide storage functionality, the communications circuitry 308 may provide network interface functionality, and the like.

As will be appreciated, any such computer program instructions (e.g., program code instructions) and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows

As mentioned, various exemplary embodiments output automated suggestions (also referred to herein as "autosuggestions" or "autocomplete suggestions") to a query suggestion interface of a group-based communication platform in response to search queries.

In this regard, as described above, in an example embodiment, the group-based communication server 113 may examine one or more stored messages that the group-based communication server 113 generated from received messages of one or more of the client devices 101A-101N of the group-based communication system 105 to generate group-based communication platform query data, which may be provided to a client device 101 for performing local (i.e., on the client device 101) search queries, as described more fully below. For example, the group-based communication server 113 may examine prior public messages (e.g., messages accessible to users of the group-based communication system 105 that have unrestricted access, i.e., are not private) received from one or more of the client devices 101A-101N and may analyze the stored messages (e.g., topics associated with the messages, message contents, message hierarchy data, attachments to messages, other metadata representative of user engagement (e.g. message reactions, clicks, sharing, etc.), past interaction data (e.g., clicking, sharing, etc.), conversations (e.g., conversation primitives), etc.), generated by the group-based communication server 113, to detect data items (e.g., terms/phrases of prior public messages, channels, files, etc.) that one or more users of the group-based communication system 105 previously utilized or interacted/engaged with for inclusion in the group-based communication platform query data.

The group-based communication server 113 may detect and include query history data (e.g., prior search queries associated with a user account) correlated to a user account associated with a client device 101 of a user for inclusion of the query history data in the group-based platform query data. Additionally, the group-based communication server 113 may detect user engagement data representing interactions with data items (e.g., messages exchanged by a user with other users (e.g., a direct message to another user, messages exchanged with other users belonging to the same channel, etc.), interaction with files (e.g., files that were pinned, designated with a star, designated with an emoji reaction, accessed by the user, etc.), of the group-based communication platform, by a client device 101 of a user correlated to a user account for inclusion of the user engagement data in the group-based communication platform query data.

Additionally, or alternatively, the group-based communication server 113 may detect common user engagement data representing interactions with data items (e.g., messages exchanged between users of a channel, files accessed by a user(s) of a channel, etc.) of the group-based communication platform by a subset of group-based communication system 105 users (e.g., a group of users that are members of the same channel) that are determined to share profile attributes with a user account associated with the client device 101 of the user for inclusion of the common user engagement data in the group-based communication platform query data.

Furthermore, additionally, or alternatively, the group-based communication server 113 may detect general user engagement data representing interactions with data items (e.g., messages exchanged between users, files accessed by users) of the group-based communication system 105 by all users of the group-based communication system 105 for inclusion of the general user engagement data in the group-based communication platform query data.

The group-based communication server 113 may store the group-based communication platform query data in the one or more databases 115 and may prioritize and rank the group-based communication platform query data, as described more fully below.

In order to prioritize/rank the data items of the group-based communication platform query data, the group-based communication server 113 may assign scores or weights to the data items. In this regard, for example, as a client device 101 utilizes an app (e.g., a SLACK® app) to interact with the group-based communication system 105 and/or is otherwise authenticated (e.g., by the group-based communication server 113 in response to validating login credentials (e.g., entered via a web site, etc.) of a corresponding user account) as being logged into the group-based communication system 105, the group-based communication server 113 may identify, and store in the one or more databases 115, each instance in which a client device 101 of a user associated with a user account interacts with items of data (e.g., a file, messages with another user(s), etc.) of the group-based communication system 105 in real-time. For instance, as the user interacts with an item (e.g., a file) of data of the group-based communication system 105, the client device 101 may send an indication of the user interaction and a timestamp of the user interaction in a client log (also referred to herein as "clogs") to the group-based communication server 113.

As a request for the group-based communication platform query data is sent from the client device 101 associated with a user account of the user (e.g., in response to detecting non-keystroke engagement of a search input interface of the client device) to the API component 117, the group-based communication server 113 may search for and identify any data items (e.g., files, messages with other users, etc.) detected as interacted with by the client device 101 of the user associated with the user account (or data interactions by client devices of other users) and may utilize the detected user interactions, in part, to assign a score, or weight to the data items of group-based communication platform query data, as described more fully below. The scored/weighted data items of group-based communication platform query data may be utilized for suggested query items of candidate search recommendations and/or navigational items.

In some example embodiments, the group-based communication server 113 may score/weight data items of the group-based communication platform query data by utilizing a combination of interaction frequency and interaction recency for user and channel suggestions. as well as based on text features for query searches such as searching for exact text matches, normalized text matches, size of overlap between strings and the like. Interaction frequency may pertain to how often a user interacts with one or more users, for example, other users of a channel. Consider an example in which there are 10 users of a channel. Each of the 10 users (e.g., users 1-10) may be assigned an interaction frequency sub-score based on score values between 0-1. In this regard, a user(s) of the channel that a given user interacts with the most may be assigned, by the group-based communication server 113, a higher sub-score (e.g., 0.4) relative to other users of the channel.

Interaction recency may pertain to the recency in which a given user interacts with one or more other users of the channel. In this regard, each of the 10 users (e.g., users 1-10) may be assigned an interaction recency sub-score based on score values between 0-1. In this regard, a user(s) of the channel that a given user interacts with most recently may be assigned, by the group-based communication server 113, a higher sub-score (e.g., 0.3) relative to other users of the channel.

Text items pertaining to query searches may be assigned a text feature sub-score, by the group-based communication server 113, based on detecting exact text matches, normalized text matches, size of overlap between text strings and the like. Text items that are determined, by the group-based communication server 113, as relevant to a query search may be assigned a higher sub-score (e.g., 0.2) relative to other text items.

Each of the combination of sub-scores corresponding to data items of the group-based communication platform query data may be aggregated and summed, by the group-based communication server 113, to obtain a final score for a corresponding data item (e.g., 0.4+0.3+0.2=0.9).

In an example embodiment, the scores or sub-scores may have weight values that are learned (e.g., trained) by the group-based communication server 113 by evaluating past user behavior. The group-based communication server 113 may produce weight values for data items that are most likely to be selected by a user from suggested search results as the highest scores. For instance, the group-based communication server 113 may evaluate suggested search results that users selected over a time period as successful recommendations and may utilize this information to train a model (e.g., using a linear regression model, a regression tree model or a neural network) for adjusting weight values of scores/sub-scores (e.g., the interaction frequency sub-score, the interaction recency sub-score, the text feature sub-score).

In some other example embodiments, the group-based communication server 113 may score/weight data items that a client device 101 of a user (e.g., a client device associated with a user account that sent a request for the group-based communication platform query data) interacted with (e.g., the user pinned a new document, the user accessed an older document) with a high score. The group-based communication server 113 may also score/weight new user interactions with data items of the group-based communication system 105 detected in-real time (e.g., detection of a link to a newly created file posted by another user) with a high score.

The group-based communication server 113 may also score/weight data items of past query searches by a client device 101 of a user associated with a user account and data items detected as having a number (e.g., 11) of user interactions (e.g., 11) exceeding a predefined threshold (e.g., 10) with an intermediate score (e.g., one or more scores that are lower than a high score). In this regard, data items that are interacted with more frequently may be more relevant than other data items that interacted with less frequently. The group-based communication server 113 may also score/weight data items interacted with by client devices of other users of a channel(s) (e.g., client devices 101A-101N of users of a channel other than a client device 101 of the user sending the request for the group-based communication platform query data) with a lower score (e.g., a lower score relative to high scores and intermediate scores).

For purposes of illustration and not of limitation, data items of the group-based communication platform query data may range between score values of 0-1. In this regard, for example, prior user interaction with data items by a client device of a user associated with a user account sending a request to the group-based communication server 113 for the group-based communication platform query data may be assigned a score value of 0.4. The group-based communication server 113 may assign recently detected user interactions with data items (e.g., user interactions with data items detected in real-time, (e.g., real-time detection of interactions with new files, new messages with other users detected in real-time, etc.) of the group-based communication system 105 with a score value 0.4.

The group-based communication server 113 may assign past query searches by a client device 101 of a user associated with a user account sending the request for the group-based communication platform query data a score of 0.3. The group-based communication server 113 may also assign data items detected as having a number of user interactions (e.g., 11) exceeding a predefined threshold (e.g., 10) with a score value of 0.3. In addition, the group-based communication server 113 may assign data items interacted with by client devices 101 of other users of a channel(s) (e.g., client devices of users of a channel other than a client device of the user sending the request for the group-based communication platform query data) with a score of 0.2.

In an example embodiment, some data items may overlap in different categories. For example, a data item interacted with by a client device of a user account that sent a request for group-based communication platform query data (e.g., assigned a score of 0.4 as described above) may also be a new user interaction of the group-based communication system 105 detected in real time (e.g., assigned a score of 0.4 as described above). The group-based communication server 113 may sum scores (e.g., 0.4+0.4=0.8 in the example above) assigned to each data item, if applicable, and may prioritize the order of the data items in the group-based platform query data based on the final (summed) score with data items having a higher score being higher in the order relative to other data items of the group-based communication platform query data.

It should be pointed out that the above scoring of data items by the group-based communication server 113 are for purposes of illustration and not of limitation and any other suitable scoring of the data items, may be performed by the group-based communication server 113 without departing from the spirit and scope of the invention.

In response to prioritizing/ordering the data items of the group-based communication platform query data, the group-based communication server 113 may send the group-based communication platform query data to a requesting client device 101.

Upon receipt, the requesting client device 101 may store the group-based communication platform query data in a database (e.g., permitted database 314), which the user account associated with the client device 101 of the user is authorized to access.

In some example embodiments, the group-based communication server 113 may receive (e.g., in a received clog(s) in the manner described above) one or more new detections of user interactions with data items and/or new search query history data detected by a requesting client device 101 of a user associated with a user account as well as client devices 101 of other users of the group-based communication system 105 after the group-based communication server 113 sent the initial group-based communication platform query data to the requesting client device 101. In this regard, the group-based communication server 113 may utilize the new user interactions and/or new search query history data to update and re-prioritize the data items of the group-based communication platform query data for inclusion in an update query data file. The group-based communication server 113 may store the update query data file (e.g., having the updated group-based communication query data) in the one or more databases 115 and may provide the update query data file to the requesting client device 101 for example during an update cycle. In one example embodiment, the group-based communication server 113 may provide the update query data file nightly to the client device 101. In some other example embodiments, the group-based communication server 113 may provide the update query data file to the client device 101 during any other suitable update cycle (e.g., a time period after initial receipt of group-based communication platform query data, during a following day, etc.).

In one example embodiment, the autosuggestion circuitry 312 of client device 101 may rank the data items of initially received group-based communication platform query data, or update the ranking of the data items of updated group-based communication platform query data in the update query data file, as suggested query items (e.g., as candidate search recommendations and/or navigational items for potential inclusion in a query suggestion interface) for recommended suggestions to a query suggestion interface (e.g., query suggestion interface 404 of FIG. 4) responsive to the detection of non-keystroke engagement of a search input interface (e.g., search input interface 402 of FIG. 4). The autosuggestion circuitry 312 of the client device 101 may perform the ranking by ranking the data items related to a user account of a user associated with the client device 101 higher in the ranking according to score (e.g., with data items having higher scores ranked higher in the rank order than lower scores).

In one example embodiment, the autosuggestion circuitry 312 of the client device 101 may determine a first subset of the suggested query items to include in a query suggestion interface as recommended suggestions based in part on comparing a ranking of the suggested query items to a predetermined threshold. For example, the query suggestion interface may be predefined to include a predetermined number (e.g., 10) of suggested query items. As such, in an example embodiment, the top number (e.g., top 10) of suggested query items in the ranking (e.g., data items with the top 10 scores) corresponding to the predetermined number (e.g., 10) of suggested query items defined for inclusion in the query suggestion interface may define the first subset of the suggested query items.

In an alternative example embodiment, the autosuggestion circuitry 312 of the client device 101 may determine that suggested query items having a score above a predetermined threshold (e.g., 0.6) may be included in the query suggestion interface as the first subset of suggested query items. In this regard, the first subset of suggested query items included in the query suggestion interface for display may vary between 1 and some upper limit number (e.g., 10) of suggested query items defined to be included in the query suggestion interface.

Referring now to FIG. 4, an exemplary user interface is provided according to an example embodiment. In response to determining the first subset of suggested query items, the autosuggestion circuitry 312 of the client device 101 may launch a query suggestion interface 404, of a user interface 400, including the first subset of the suggested query items (e.g., suggested query items 406).

In the example user interface 400 of FIG. 4, the autosuggestion circuitry 312 of the client device 101 launched/presented the query suggestion interface 404 with six suggested query items 406 as recommended navigational suggestions. In this regard, in the example of FIG. 4, one of the suggested query items 406 pertains to a selectable suggestion to communicate directly with Vickie Doe, and another of the selected suggested query items 406 relates to a selectable suggestion to communicate directly with Vince Roe (e.g., which indicates that Vince Roe is currently "Out to lunch"). Furthermore, the suggested query items 406 pertains to selectable suggestions to communicate with one or more users of a channel such as channel feature-video-teleconferences or the private channel #victory-results. Another selectable suggestion of the suggested query items 406 pertains to accessing search query results for a past "video conference" search query. In addition, another selectable suggestion of the suggested query items 406 relates to accessing a Video Game file (also referred to herein as Video Game Document).

As an example, in response to detection of an indication of a selection of the suggested query item (e.g., a query selection indication) from the query suggestion interface 404 pertaining to Vickie Doe, the autosuggestion circuitry 312 of the client device 101 may launch a direct messaging interface (e.g., displayed via display 310) for the user of the client device 101 to communicate directly with Vickie Doe. In some example embodiments, the autosuggestion circuitry 312 may launch the direct messaging interface directly and without performing an intervening database step to query a permitted database (e.g., permitted database 314) for associated data.

As another example, in response to detection of an indication of a selection of the suggested query item from the query suggestion interface 404 pertaining to the channel #feature-video-teleconferences, the autosuggestion circuitry 312 of the client device 101 may launch a user interface (e.g., displayed via display 310) for the user of the client device 101 to communicate directly with users of the channel #feature-video-teleconferences.

Figure 5:
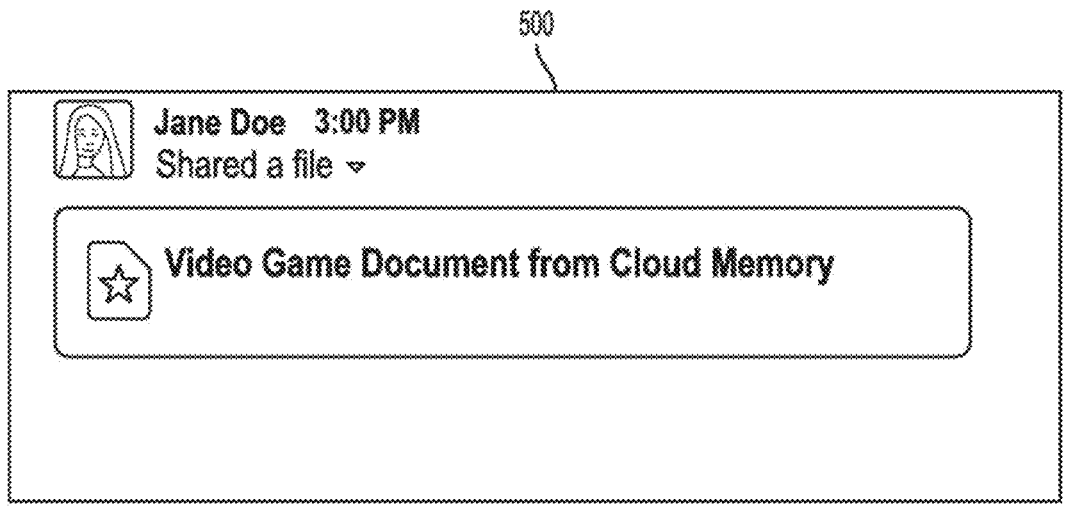

As yet another example, in response to detection of an indication of a selection of the suggested query item from the query suggestion interface 404 pertaining to the Video Game file, the autosuggestion circuitry 312 of the client device 101 may launch a user interface (e.g., displayed via display 310), such as for example user interface 500 shown in FIG. 5, to provide the user with direct access to the Video Game file. As shown in FIG. 5, the Video Game file was shared by Jane Doe. In the example of FIG. 5, the Video Game file may be stored in cloud memory.

In an example embodiment, in response to detecting a keystroke input to a search input interface (e.g., search input interface 602 of FIG. 6), the autosuggestion circuitry 312 of the client device 101 may update the ranking (as each keystroke is input to the search input interface) of the suggested query items associated with the group-based communication platform query data based on the detected keystroke(s) to define a second subset of the suggested query items. For purposes of illustration and not of limitation, in an instance in which a letter "s" is entered into the search input interface, the autosuggestion circuitry 312 may query one or more databases such as, for example: database 317 storing the files interacted with by the client device 101 correlated to a user account of a user; the database 318 storing the top files for the user and a group-based communication channel(s)/group(s) of users in which the user of the client device 101 belongs; the database 319 storing the top query suggestions for the user and group-based communication channel(s)/group(s) of users in which the user of client device 101 belongs; the database 320 storing the message communications detected for the client devices (e.g., client devices 101A-101N) correlated to user accounts of the users of the group-based communication system 105; the database 321 storing the message communications detected for a group of users of a group-based communication channel(s); and/or the database 314, for data items of the group-based communication platform query data associated with terms that begin with the letter "s". In this regard, a number (e.g., 10) of detected terms, by the autosuggestion circuitry 312, beginning with the letter "s" that have top scores (e.g., top 10 scores) may be defined by the autosuggestion circuitry 312 as a second subset of the suggested query items.

Furthermore, in an instance in which the user subsequently enters an "l" such that "sl" is input to the search input interface, the autosuggestion circuitry 312 of the client device 101 may query one or more databases such as, for example, database 317, database 318, database 319, database 320, database 321 and/or database 314 for data items of the group-based communication platform query data associated with terms that contain the letters "sl". In this regard, a number (e.g., 10) of detected terms, by the autosuggestion circuitry 312, containing the letters "sl" that have top scores (e.g., top 10 scores) may be defined, by the autosuggestion circuitry 312, as a second subset of the suggested query items, so on and so forth.

In response to the autosuggestion circuitry 312 of the client device 101 defining the second subset of the suggested query items, the autosuggestion circuitry 312 of the client device 101 may automatically update the query suggestion interface to replace the first subset of the suggested query items (e.g., suggested query items 406) with the second subset of the suggested query items (e.g., suggested query items 606 of FIG. 6).

Referring now to FIG. 6, an example user interface relating to a query search is provided according to an exemplary embodiment. In the example of the user interface 600 of FIG. 6, the autosuggestion circuitry 312 of the client device 101 may detect the keystrokes "sli" input via the search input interface 602 by a user of the client device 101. In this regard, the autosuggestion circuitry 312 of the client device 101 may update a ranking of suggested query items based on the detected keystrokes "sli" to determine relevant suggestions for the keystrokes "sli". In the example of FIG. 6, the autosuggestion circuitry 312 of the client device 101 detected three suggestions as suggested query items 606 (also referred to herein as second subset of suggested query items 606).

In response to the autosuggestion circuitry 312 of the client device 101 determining the second subset of suggested query items 606, the autosuggestion circuitry 312 of the client device 101 may automatically update a query suggestion interface (e.g., query suggestion interface 604) to replace a first subset of the suggested query items (e.g., suggested query items 406) with the second subset of the suggested query items 606.

In the example of FIG. 6, one of the suggested query items 606 pertains to a selectable suggestion to access search query results for a past "sli roadmap" search query and another of the suggested query items 606 relates to a selectable suggestion to communicate with one or more users of a channel such as channel #comment-sli. The suggested query items 606 also include a selectable suggestion 608 to access a SLI Meeting Agenda file (also referred to herein as SLI Meeting Agenda Document).

As an example, in response to the autosuggestion circuitry 312 of the client device 101 detecting an indication of a selection of the "sli roadmap" search query, the autosuggestion circuitry 312 may query one or more memories (e.g., database 314, memory 304) to retrieve associated data of the past chat messages associated with the term "sli roadmap" to present in a user interface of the client device 101.

Figure 7:
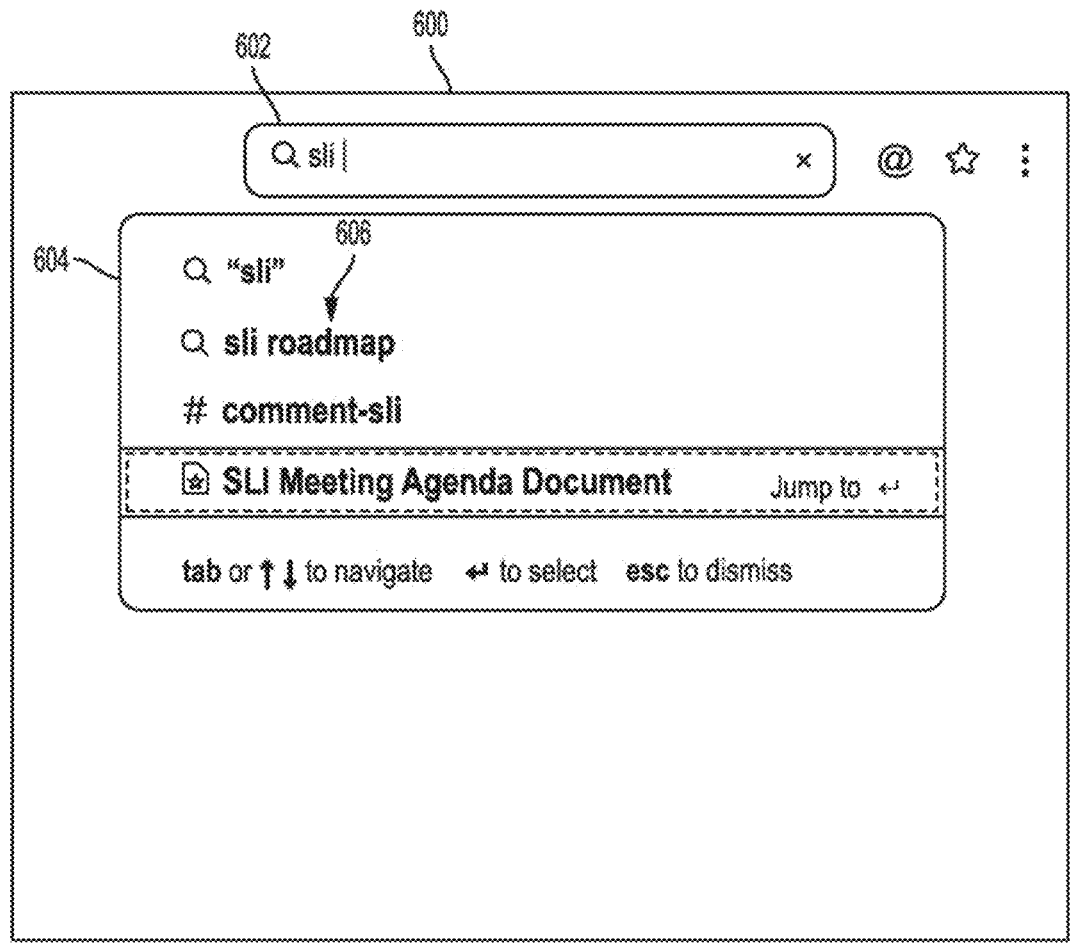

As shown in FIG. 7, the autosuggestion circuitry 312 of the client device 101 may detect a selection of the suggested query items 606 from the query suggestion interface 604 such as, for example, detection of a selection of the selectable suggestion 608 pertaining to the SLI Meeting Agenda file in order for the autosuggestion circuitry 312 to query one or more memories (e.g., database 314, memory 304) to retrieve associated data to launch/present a user interface with direct access to the SLI Meeting Agenda file.

Figure 8:
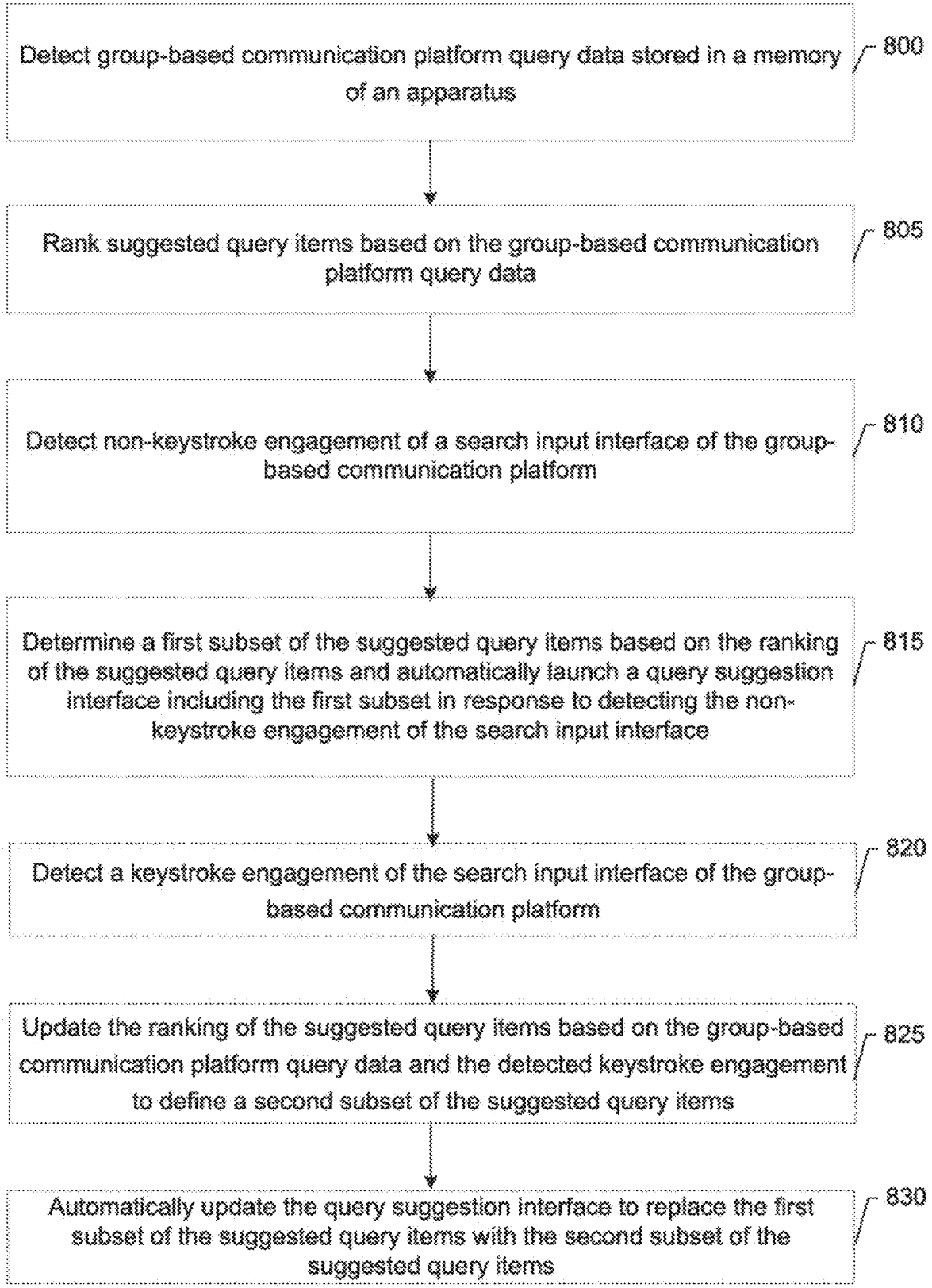
FIG. 8 is an example flow chart illustrating example methods in accordance with some embodiments of the present invention.

Referring now to FIG. 8, an example embodiment of a flowchart for outputting suggested query items by a group-based communication platform according to an example embodiment is provided. At operation 800, an apparatus (e.g., client device 101) may detect group-based communication platform query data stored in a memory (e.g., a database 314 of memory 304) of the apparatus. At operation 805, the apparatus (e.g., client device 101) may rank suggested query items based on the group-based communication platform query data.

At operation 810, the apparatus (e.g., client device 101) may detect non-keystroke engagement of a search input interface (e.g., search input interface 402) of the group-based communication platform. At operation 815, the apparatus (e.g., client device 101) may determine a first subset of the suggested query items based on the ranking of the suggested query items and automatically launch a query suggestion interface (e.g., query suggestion interface 404) including a first subset of the suggested query items (e.g., suggested query items 406) in response to detecting the non-keystroke engagement of a search input interface. Optionally, at operation 820, the apparatus (e.g., client device 101) may detect a keystroke engagement (e.g., entering of one or more keystrokes) of the search input interface (e.g., search input interface 602) of the group-based communication platform.

Optionally, at operation 825, the apparatus (e.g., client device 101) may update the ranking of the suggested query items based on the group-based communication platform query data and the detected keystroke engagement to define a second subset of the suggested query items (e.g., suggested query items 606). Optionally, at operation 830, the apparatus (e.g., client device 101) may automatically update the query suggestion interface (e.g., query suggestion interface 604) to replace the first subset of the suggested query items (e.g., suggested query items 406) with the second subset of the suggested query items (e.g., suggested query items 606).

In another example embodiment in an instance in which the apparatus (e.g. client device 101) receives updated group-based communication platform query data (e.g., during an update cycle) from a server (e.g., group-based communication server 113), the apparatus (e.g., client device 101) may store the updated group-based communication platform query data to a memory (e.g., database 314) of the apparatus and may rank updated suggested query items based on the updated group-based communication platform query data. The apparatus (e.g., client device 101) may also detect post-update non-keystroke engagement of the search input interface (e.g., a non-keystroke engagement of the search input interface detected after receipt of updated group-based communication platform query data) of the group-based communication platform. The apparatus (e.g., client device 101) may also determine an updated subset of the suggested query items based on the ranking of the updated suggested query items and may automatically launch a post-update query suggestion interface (e.g., a query suggestion interface launched after receipt of updated group-based communication platform query data) including the updated subset of the updated suggested query items in response to detecting the post-update non-keystroke engagement of the search input interface.

Figure 9:
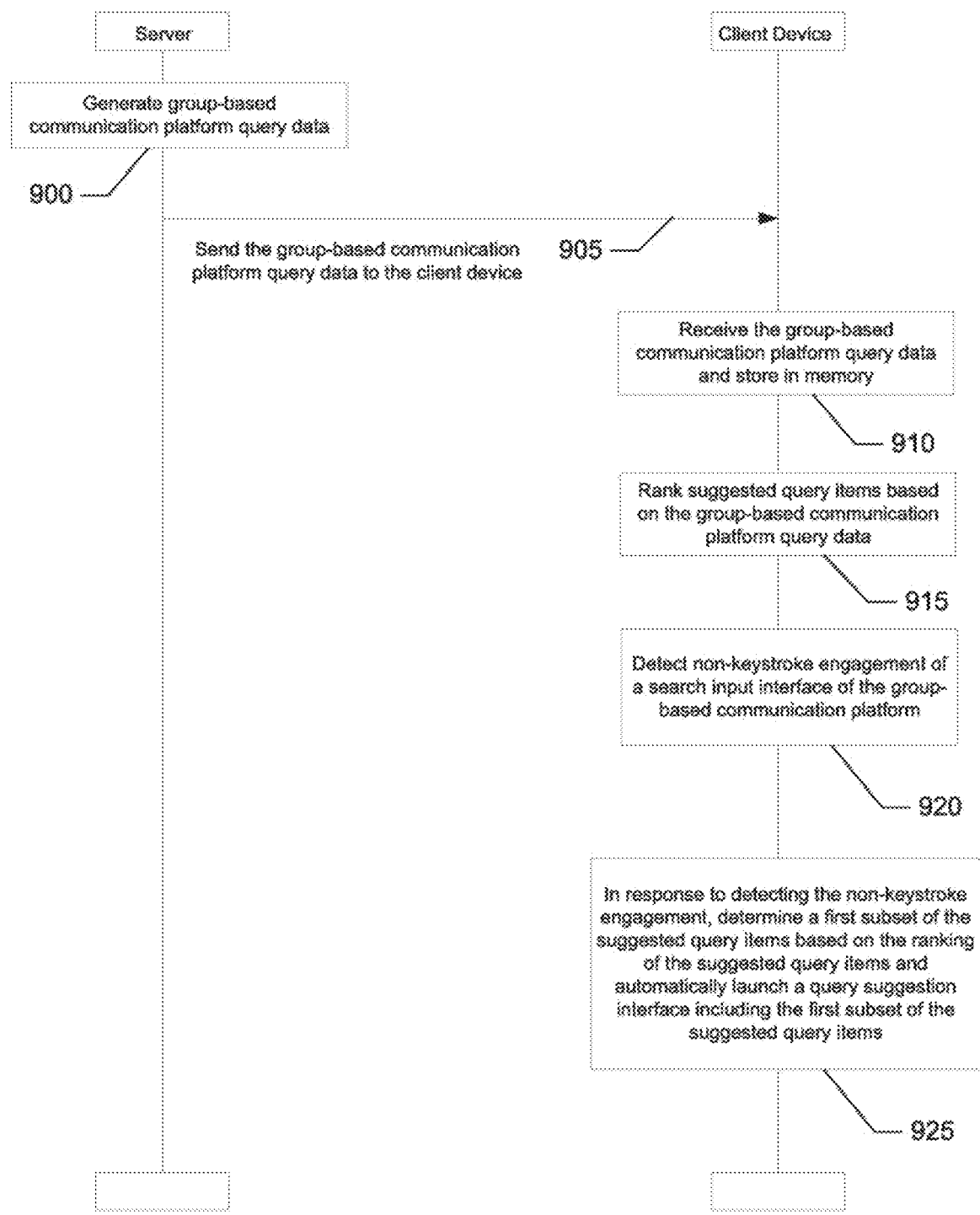
FIG. 9 is a signal diagram illustrating example methods in accordance with some exemplary embodiments of the invention.

Referring now to FIG. 9, an example embodiment of a signal diagram of a system for outputting suggested query items by a group-based communication platform according to an example embodiment is provided. At operation 900, a server (e.g., group-based communication server 113) may generate group-based communication platform query data. At operation 905, the server (e.g., group-based communication server 113) may send the group-based communication platform query data to a client device (e.g., client device 101). At operation 910, the client device (e.g., client device 101) may receive the group-based communication platform query data and may store the group-based communication platform query data in memory (e.g., a database 314 of memory 304). At operation 915, the client device (e.g., client device 101) may rank suggested query items based on the group-based communication platform query data.

At operation 920, the client device (e.g., client device 101) may detect non-keystroke engagement of a search input interface (e.g., search input interface 402) of the group-based communication platform. At operation 925, the client device (e.g., client device 101) may, in response to detecting the non-keystroke engagement of a search input interface, determine a first subset of the suggested query items based on the ranking of the suggested query items and automatically launch a query suggestion interface (e.g., query suggestion interface 404) including a first subset of the suggested query items (e.g., suggested query items 406).

Additional Implementation Details

Although example processing systems have been described in FIGS. 1-3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. A method, comprising:
maintaining a local store comprising group-based communication platform query data associated with a client device;
receiving an indication of a non-keystroke engagement of a search input interface of the client device;
generating, on the client device, a group-based communication platform query data result responsive to receiving the indication of the non-keystroke engagement, the group-based communication platform query data result comprising:
a plurality of data items associated with recent query items or members of a group-based communication channel, wherein each data item of the plurality of data items corresponds to a respective group-based communication channel of a group-based communication platform; and
a ranking of the plurality of data items based at least in part on interactions with at least some of the plurality of data items by a user of the client device;
receiving, from the user, a selection of a data item of the plurality of data items; and
causing display of a user interface that allows the user of the client device to send a new message to at least one member of the respective group-based communication channel associated with the data item selected by the user.

2. The method of claim 1, wherein the group-based communication platform query data maintained in the local store of the client device comprises data associated with recent searches performed by the user within the search input interface.

3. The method of claim 1, wherein the plurality of data items associated with recent query items or members of the respective group-based communication channel are displayed via a dropdown menu of the user interface.

4. The method of claim 1, wherein the user interface comprises a direct messaging interface between the user of the client device and the at least one member of the respective group-based communication channel.

5. The method of claim 1, wherein causing display of the user interface comprises:
navigating from a first user interface to a second user interface in response to the selection of the data item of the plurality of data items, the first user interface comprising a list of one or more group-based communication platform query results, the second user interface comprising information associated with the respective group-based communication channel.

6. The method of claim 1, further comprising:
displaying a respective graphical identifier for each data item of the plurality of data items associated with recent query items or members of the group-based communication channel.

7. The method of claim 1, further comprising:
filtering the plurality of data items associated with recent query items or members of the group-based communication channel based at least in part on a keystroke engagement received after the non-keystroke engagement of the search input interface of the client device.

8. An apparatus, comprising:
one or more memories storing code; and
one or more processors coupled with the one or more memories and individually or collectively operable to execute the code to cause the apparatus to:
maintain a local store comprising group-based communication platform query data associated with a client device;
receive an indication of a non-keystroke engagement of a search input interface of the client device;
generate, on the client device, a group-based communication platform query data result responsive to receiving the indication of the non-keystroke engagement, the group-based communication platform query data result comprising:
a plurality of data items associate with recent query items or members of a group-based communication channel, wherein each data item of the plurality of data items corresponds to a respective group-based communication channel of a group-based communication platform; and
a ranking of the plurality of data items based at least in part on interactions with at least some of the plurality of data items by a user of the client device;
receive, from the user, a selection of a data item of the plurality of data items; and
cause display of a user interface that allows the user of the client device to send a new message to at least one member of the respective group-based communication channel associated with the data item selected by the user.

9. The apparatus of claim 8, wherein the group-based communication platform query data maintained in the local store of the client device comprises data associated with recent searches performed by the user within the search input interface.

10. The apparatus of claim 8, wherein the plurality of data items associated with recent query items or members of the respective group-based communication channel are displayed via a dropdown menu of the user interface.

11. The apparatus of claim 8, wherein the user interface comprises a direct messaging interface between the user of the client device and the at least one member of the respective group-based communication channel.

12. The apparatus of claim 8, wherein, to cause display of the user interface, the one or more processors are individually or collectively operable to execute the code to cause the apparatus to:
navigate from a first user interface to a second user interface in response to the selection of the data item of the plurality of data items, the first user interface comprising a list of one or more group-based communication platform query results, the second user interface comprising information associated with the respective group-based communication channel.

13. The apparatus of claim 8, wherein the one or more processors are individually or collectively further operable to execute the code to cause the apparatus to:
display a respective graphical identifier for each data item of the plurality of data items associated with recent query items or members of the group-based communication channel.

14. The apparatus of claim 8, wherein the one or more processors are individually or collectively further operable to execute the code to cause the apparatus to:
filter the plurality of data items associated with recent query items or members of the group-based communication channel based at least in part on a keystroke engagement received after the non-keystroke engagement of the search input interface of the client device.

15. A non-transitory computer-readable medium storing instructions executable by one or more processors to:
maintain a local store comprising group-based communication platform query data associated with a client device;
receive an indication of a non-keystroke engagement of a search input interface of the client device;
generate, on the client device, a group-based communication platform query data result responsive to receiving the indication of the non-keystroke engagement, the group-based communication platform query data result comprising:
a plurality of data items associate with recent query items or members of a group-based communication channel, wherein each data item of the plurality of data items corresponds to a respective group-based communication channel of a group- based communication platform; and
a ranking of the plurality of data items based at least in part on interactions with at least some of the plurality of data items by a user of the client device;
receive, from the user, a selection of a data item of the plurality of data items; and
cause display of a user interface that allows the user of the client device to send a new message to at least one member of the respective group-based communication channel associated with the data item selected by the user.

16. The non-transitory computer-readable medium of claim 15, wherein the group-based communication platform query data maintained in the local store of the client device comprises data associated with recent searches performed by the user within the search input interface.

17. The non-transitory computer-readable medium of claim 15, wherein the plurality of data items associated with recent query items or members of the respective group-based communication channel are displayed via a dropdown menu of the user interface.

18. The non-transitory computer-readable medium of claim 15, wherein the user interface comprises a direct messaging interface between the user of the client device and the at least one member of the respective group-based communication channel.

19. The non-transitory computer-readable medium of claim 15, wherein the instructions to cause display of the user interface are executable by the one or more processors to:
navigate from a first user interface to a second user interface in response to the selection of the data item of the plurality of data items, the first user interface comprising a list of one or more group-based communication platform query results, the second user interface comprising information associated with the respective group-based communication channel.

20. The non-transitory computer-readable medium of claim 15, wherein the instructions are further executable by the one or more processors to:
display a respective graphical identifier for each data item of the plurality of data items associated with recent query items or members of the group-based communication channel.

* * * * *